(12) United States Patent
LaBorde

(10) Patent No.: US 6,571,641 B1
(45) Date of Patent: *Jun. 3, 2003

(54) ON-LINE SENSOR MOUNT ASSEMBLY

(75) Inventor: Richard G. LaBorde, Maple Grove, MN (US)

(73) Assignee: AgriChem, Inc., Ham Lake, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/859,649

(22) Filed: May 18, 2001

Related U.S. Application Data

(60) Provisional application No. 60/270,234, filed on Feb. 21, 2001.

(51) Int. Cl.[7] ................................................. G01F 1/00
(52) U.S. Cl. ............................................ 73/861; 73/273
(58) Field of Search ............................... 73/861, 861.17, 73/202, 861.41, 273, 431, 865.5, 865.8, 866, 863.21, 863.22, 863.41, 863.42, 863.43

(56) References Cited

U.S. PATENT DOCUMENTS

| | | |
|---|---|---|
| 4,168,466 A | 9/1979 | Boldt |
| 4,958,741 A | 9/1990 | Johanson |
| 5,332,307 A | 7/1994 | LeGigan |
| 5,361,945 A | 11/1994 | Johanson |
| 5,363,708 A | 11/1994 | Johnson |
| 5,500,083 A | 3/1996 | Johanson |
| 6,192,750 B1 * | 2/2001 | Greer et al. .................. 73/273 |

* cited by examiner

Primary Examiner—Harshad Patel
Assistant Examiner—Charlene Dickens
(74) Attorney, Agent, or Firm—Gray Plant Mooty Mooty & Bennett, P.A.

(57) ABSTRACT

An on-line sensor mount assembly for monitoring one or more physical properties of a particulate material that is free flowing in the ductwork of a processing installation. The sensor mount assembly includes a vertical housing with an upwardly open inlet opening and a uniform vertical sensing passage/chamber. An outlet opening is located at the lower end of the housing. A flow metering apparatus is installed at the lower end of the housing and includes a flow metering element positioned in blocking relationship between the sensing chamber and the outlet opening. Continuous operation of the flow metering element transports material from the sensing chamber through the outlet opening at a regulated rate. This assures that the sensing chamber is full and that there is a uniform flow of material past one or more sensor elements installed on the housing and positioned to monitor the particulate material passing through the sensing chamber. The housing is adapted for installation in new or pre-existing ductwork of a processing system.

29 Claims, 5 Drawing Sheets

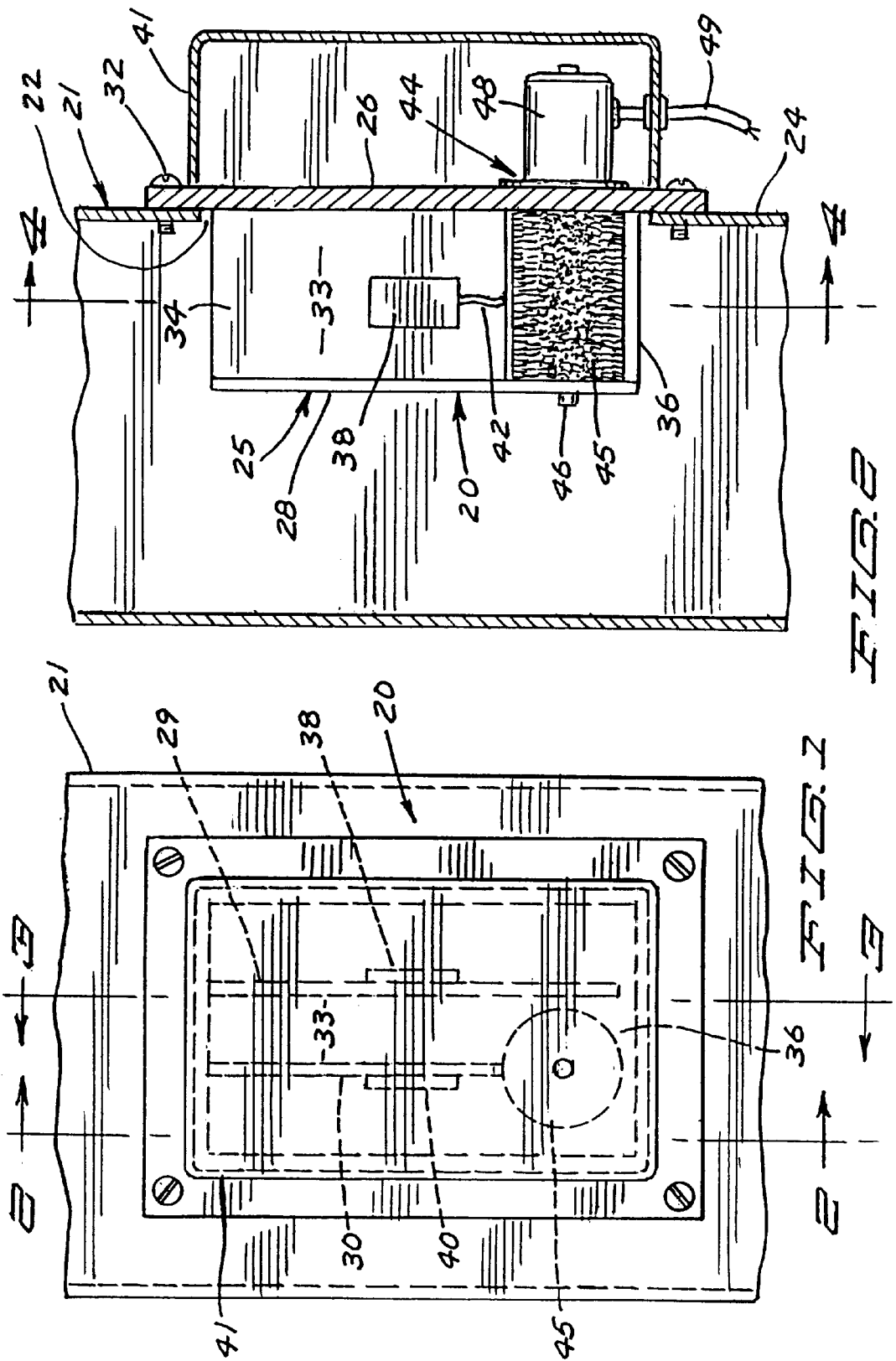

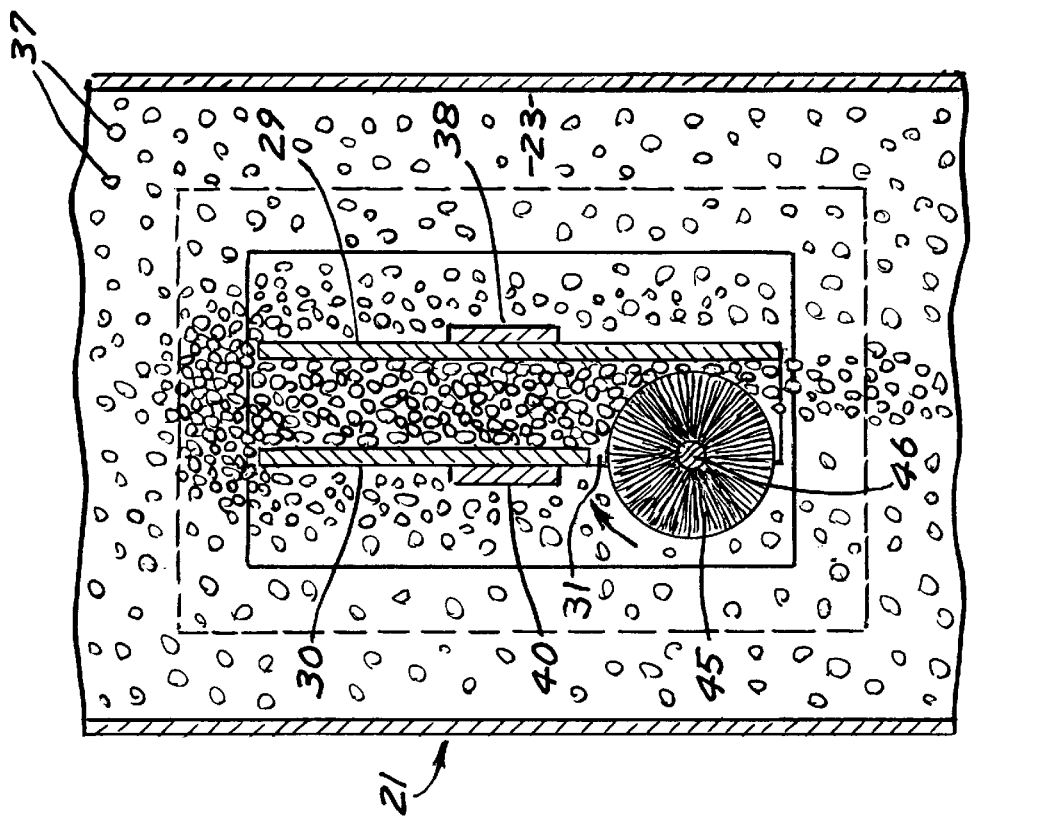
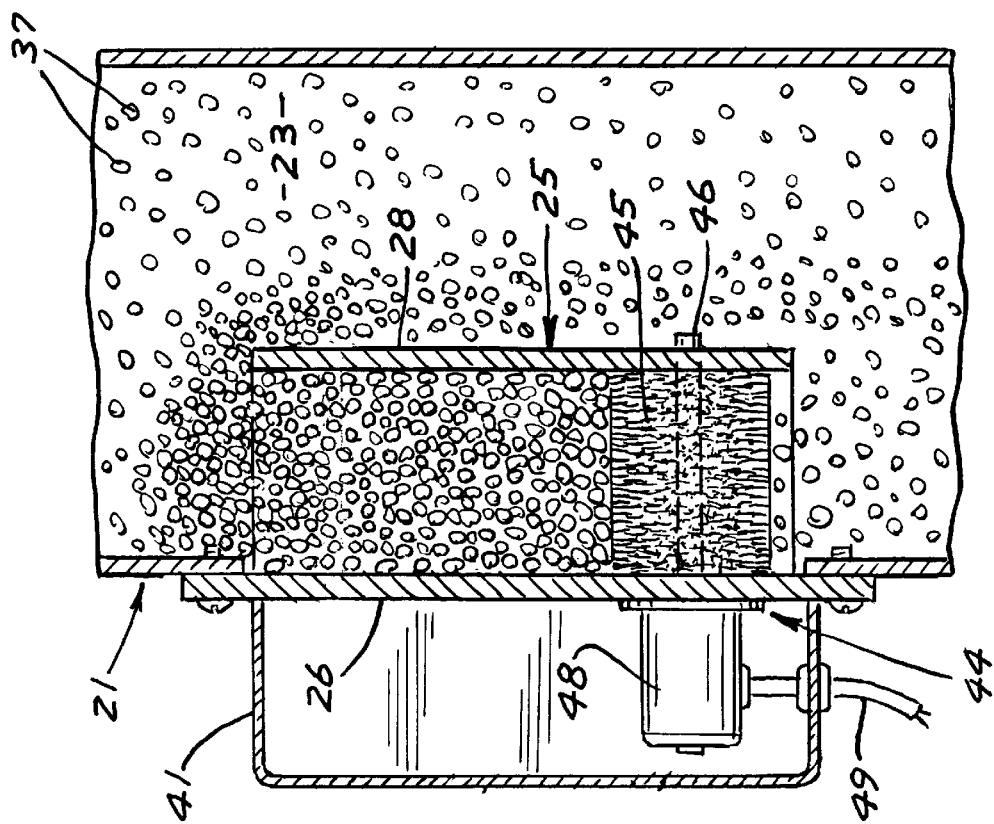

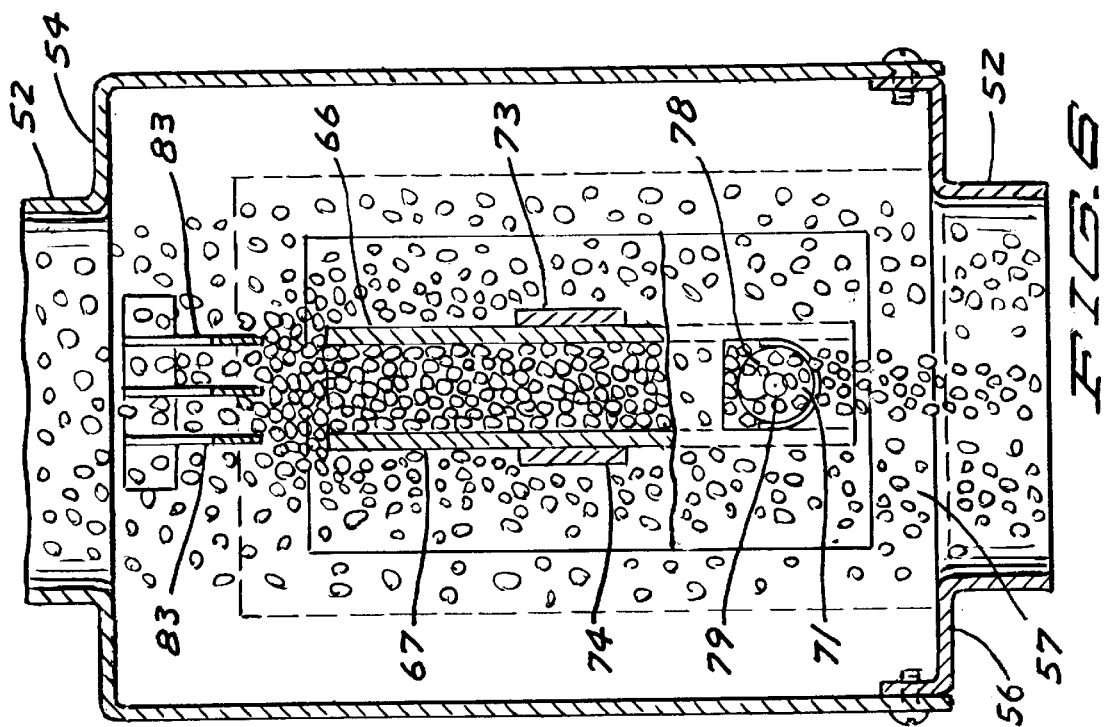
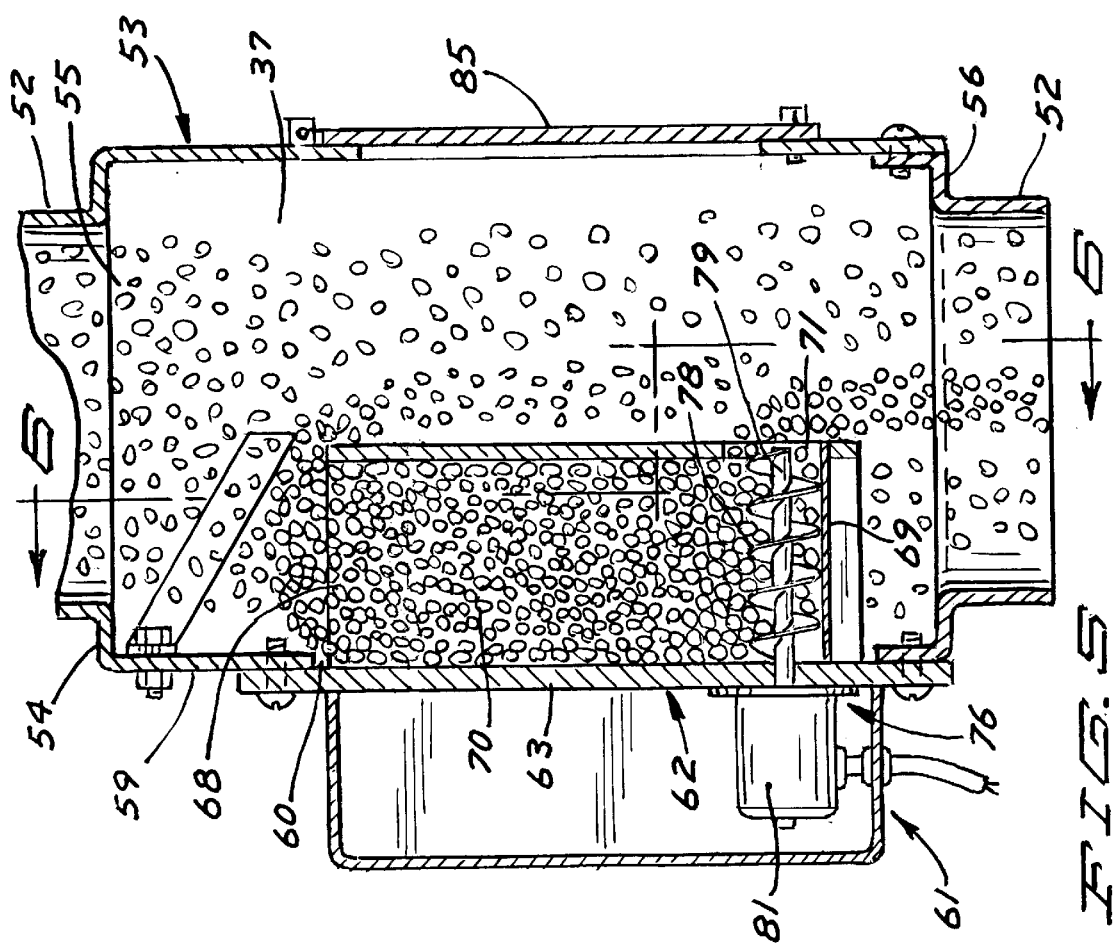

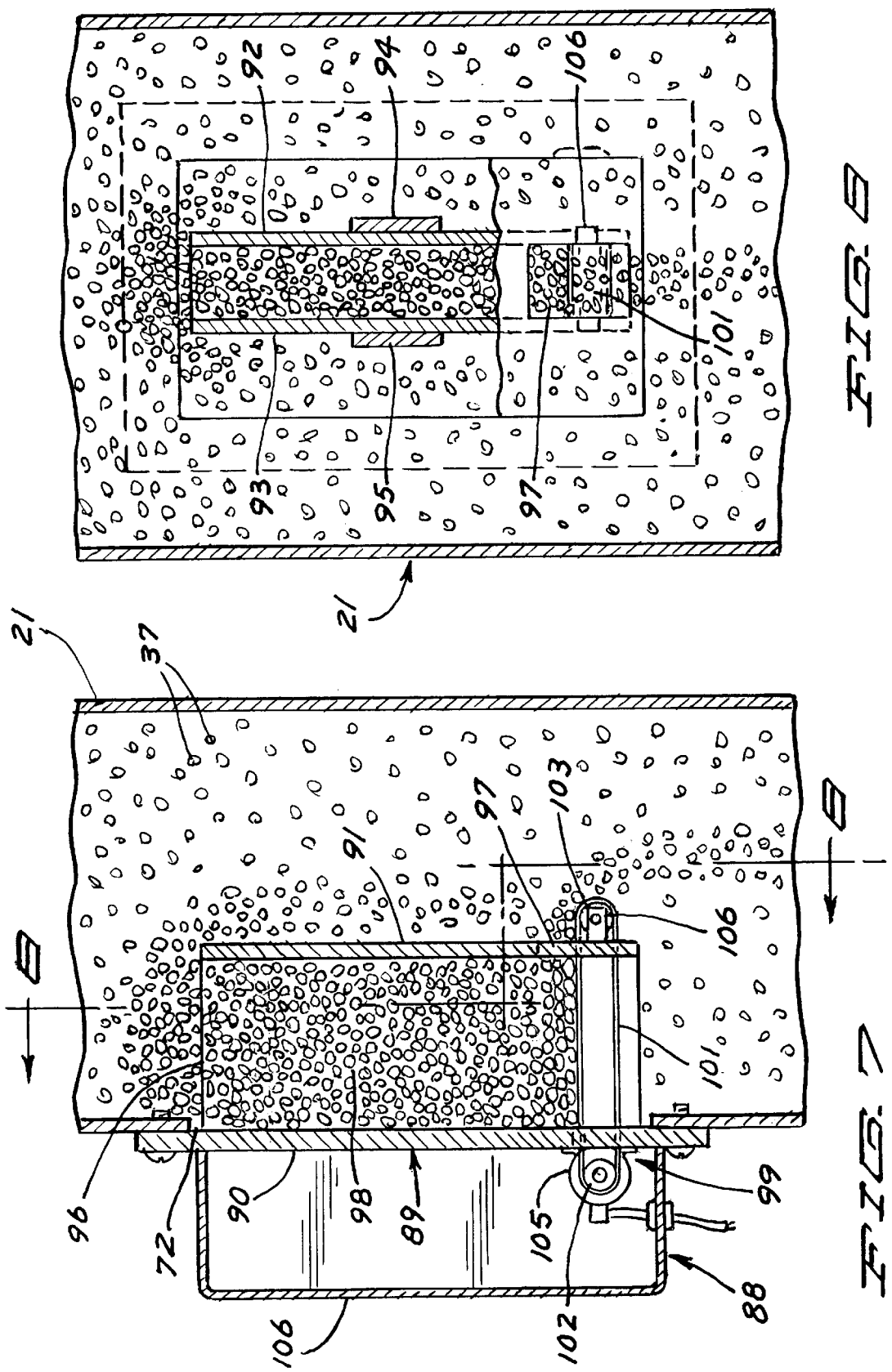

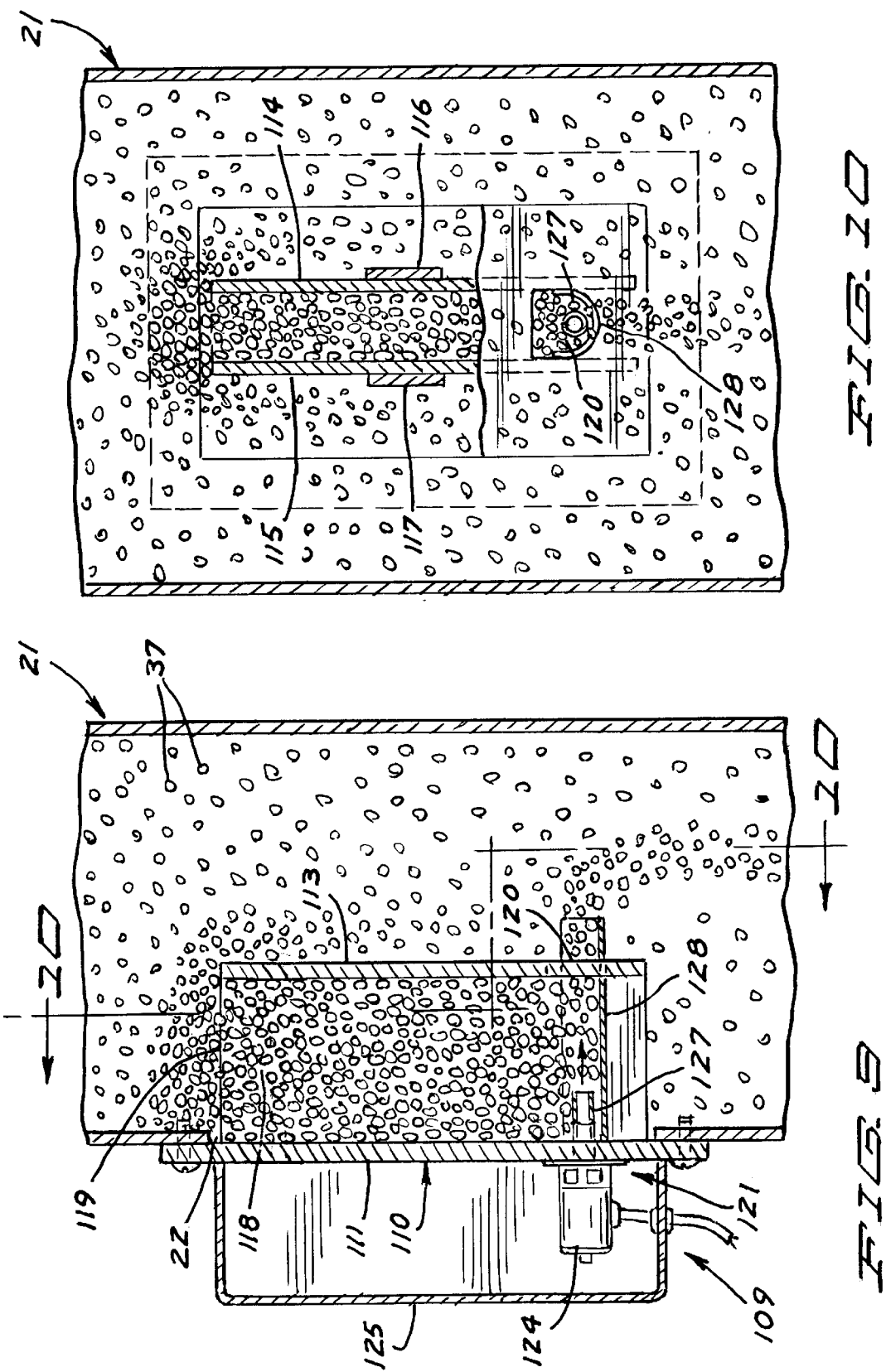

ON-LINE SENSOR MOUNT ASSEMBLY

CROSS REFERENCE TO A RELATED APPLICATION

This application claims the benefit of Provisional Application Ser. No. 60/270,234 filed Feb. 21, 2001.

BACKGROUND OF THE INVENTION

The invention pertains to on-line monitoring of one or more physical properties of a free flowing product such as a granular or particulate material. Examples of properties to be monitored are moisture content, temperature, color, etc. An example of a process where on-line monitoring is employed is in the manufacture of animal feed. When an analytical procedure or device is adapted for on-line monitoring of a manufacturing process, one of the most difficult problems encountered is the presentation of the monitored material to the sensor. For the on-line assay to have any meaning, what the sensor "sees" must accurately represent the monitored process in real time. The physical characteristics of free flowing particulate materials compound the basic problems encountered when placing an on-line sensor in a process stream. Any attempt to divert or restrict the particulate flow invites plugging or bridging. Particulate flow patterns are seldom uniform since augers and bucket elevators are commonly used to move these materials, giving the flow pattern a pulse. The particles themselves are frequently of irregular shape and size. Some particulates may be fragile and can easily be damaged or destroyed by rough sampling techniques. Some particulates because of their size and shape have difficulty moving under the influence of gravity through a sampling cell. Such materials require special attention.

In some installations it is necessary to retrofit the process stream equipment with a property sensor. This can present a problem with finished ductwork. Access to the process stream for installation of a sensor and sensor cell may be difficult. Consideration must be given to the intrusion into the process stream by the process sensor equipment.

SUMMARY OF THE INVENTION

The invention relates to an on-line sensor mount assembly for monitoring material properties of a free flowing process stream. The sensor mount assembly can readily be installed in new or pre-existent ductwork of a processing installation. The sensor mount assembly includes an open ended housing. A side wall of the housing can be flat and of suitable length and width to function as a mounting plate for installation of the housing in an opening formed in a duct wall of a duct system. Side walls of the housing define an unobstructed passage sensing chamber for free flowing particulate material. One or more material property sensor elements can be installed on one or more of the side walls. The housing has an upper inlet opening and a lower outlet opening. The housing passage is uniform from top to bottom to facilitate the free flow of particulate material and minimize clogging and bridging. A metering element of a variable speed flow metering apparatus is located in blocking relationship to the housing outlet. Operation of the flow metering element transports material through the outlet at a regulated rate. Regulating the product flow rate through the housing outlet permits control of the flow rate past a material property sensor associated with the housing. This control assures a uniform flow rate through the passage. The motive force or motor to move the metering element is located remote from the process stream duct. In one embodiment, the metering element is a brush that rotates near the outlet opening, transporting product from above it to below it. In another embodiment, the metering element is a conveyor belt; in another it is a screw conveyor; and in yet another it is a pulse or jet of air.

BRIEF DESCRIPTION OF THE DRAWINGS

FIG. 1 is a front elevational view of a sensor mount assembly according to one form of the invention installed in a process stream duct;

FIG. 2 is a sectional view of the sensor mount assembly and duct of FIG. 1 taken along the line 2—2 thereof;

FIG. 3 is another sectional view of the sensor mount assembly and duct of FIG. 1 taken along the line 3—3 thereof and in addition showing a stream of particulate material moving in the duct;

FIG. 4 is a sectional view of the sensor mount assembly and duct of FIG. 2 taken along the line 4—4 thereof and in addition showing a stream of particulate material moving in the duct;

FIG. 5 is a sectional view like that of FIG. 3 showing another embodiment of a sensor mount assembly according to the invention;

FIG. 6 is a sectional view of the embodiment of sensor mount assembly shown in FIG. 5 taken along the line 6—6 thereof;

FIG. 7 is a sectional view like that of FIG. 3 showing a further embodiment of a sensor mount assembly according to the invention;

FIG. 8 is a sectional view of the embodiment of sensor mount assembly shown in FIG. 7 taken along the line 8—8 thereof;

FIG. 9 is a sectional view like that of FIG. 3 showing a yet further embodiment of a sensor mount assembly according to the invention; and FIG. 10 is a sectional view of the embodiment of sensor mount assembly shown in FIG. 9 taken along the line 10—10 thereof.

DESCRIPTION OF PREFERRED EMBODIMENTS

Referring to the drawings, there is shown in FIGS. 1 through 4 a sensor mount assembly indicated generally at 20 installed in a vertical duct 21 which conveys product in a duct channel 23 as part of a particulate material processing system. Sensor mount assembly 20 includes a sampling housing 25 installed in a mounting opening 22 formed in a flat side wall 24 of duct 21. Housing 25 has a first wall 26 comprised as a front wall, a second wall 28 comprised as a back wall parallel to and spaced from the front wall 26, and third and fourth lateral side walls 29, 30. Front wall 26 is comprised as a mounting plate to install and mount the housing within the duct 21. Front wall 26 has dimensions larger than corresponding dimensions of mounting opening 22. Edges of the front wall 26 overlap perimeter edges of the opening 22 on the exterior side of the duct wall 24 and are secured to it by suitable fasteners such as screws 32.

The front and back walls 26, 28 are wider than the lateral side walls 29, 30. The side walls 29, 30 extend between the front and back walls 26, 28 forming a vertical, rectangular passage and sensing chamber 33 having an inlet 34 and an outlet 36. Passage 33 has a uniform cross-section throughout its length to deter clogging and bridging of particulate material. Inlet 34 is upwardly open to intercept a segment of the oncoming flow of particulate material in the duct channel 23.

A pair of sensor elements or plates 38, 40 are installed on housing side walls 29, 30 in opposed relationship. The elements as shown, are mounted exterior to the sensing chamber 33 and across from one another intermediate the inlet 34 and outlet 36. Sensor elements 38, 40 are positioned at a sensing station to monitor particulate material flow and measure one or more physical properties of particulate material flowing in the channel 23 of duct 21 and intercepted by housing 25. Examples of such process sensors are: a thermocouple or other temperature sensor for temperature determination; a near infrared sensor for moisture, protein or other assays of feedstuffs; any other reflectants spectroscopic sensor; capacitance plates for monitoring dielectric properties such as moisture content.

A utility cabinet 41 is mounted exterior to duct wall 24 and is connected to the mounting plate or front wall 26 of housing 25 opposite the side walls thereof. The sensor elements 38, 40 are connected by suitable means indicated as a lead 42 in FIG. 2, to electronics contained in the cabinet 41 (not shown) and thereafter to control or monitoring devices according to the particular application.

A flow metering apparatus is located in blocking relationship to the outlet opening 36 of housing 25 and includes a variable speed metering element. In the embodiment shown in FIGS. 1 through 4, the metering apparatus includes a brush assembly 44. Brush assembly 44 includes a round, bristle brush 45 mounted on a shaft 46. Shaft 46 is horizontal and is rotatably mounted between the front and back walls 26, 28 of housing 25. One side wall 30 is shorter than the other side wall 29 creating an opening 31 to housing 25 that connects to outlet opening 36. Brush 45 is positioned to occupy the opening 31 beneath the lower edge of the side wall 30 opposite side wall 29. Brush 45 has bristles extending radially from shaft 46 to a point adjacent the side wall 29 thereby filling and at least partially blocking the outlet opening 36.

A variable speed motor 48 is located in cabinet 41 and connected to shaft 46. Shaft 46 extends through a suitable opening provided in the front wall 26. Motor 48 can be an air motor powered through a compressed air line 49. Alternatively it can be an electric motor, a hydraulic motor, or other suitable motor. Motor 48 rotates the shaft 46 and brush 45 at a preselected and adjustable speed. The brush bristles move in a downward stroke within housing 25 sweeping a path adjacent the lower interior edge of first side wall 29.

The bristles of brush 45 are formed of a soft material that will not damage the particulate material as it is handled by the brush. The bristles are spaced apart sufficiently to engage and move product. The brush could be formed of other spaced apart, radially extended elements.

In use, the sensor mount assembly is installed in a duct carrying a process stream of particulate material moving at least partially under the influence of gravity. The process stream often will be non-uniform. A sample of the process stream is collected by the housing 25. Product enters inlet 34 in an amount generally proportionate to the cross-sectional area of duct 21 occupied by inlet opening 34.

The flow metering apparatus is effective to restrict the flow rate of particulate material through the sensing chamber to a flow rate that is generally less than the free flowing velocity of the particulate material in the process stream outside of the housing in order to assure that the sensing chamber is full and that the flow of product past the sensing station monitored by the sensor elements, is uniform.

Motor 48 is continuously operated to turn the shaft 46 and rotate brush 45. Brush 45 transports product from a lower region of the sensing chamber 33 to the outlet opening 36. The rate of discharge of product from housing 25 is controlled by rotation of the brush 45. Product impinging upon the brush 45 is carried by the bristles as the brush rotates. The product is discharged by gravity once the brush bristles encounter the outlet opening 36.

The rotational speed of the brush is adjusted to ensure that the sensing chamber 33 remains full and that a small accumulation of particulate material remains at the inlet opening (see FIGS. 3 and 4). This accumulated pool of particulate material provides a constant density column and constant velocity of material flowing past the sensing station, creating a consistent, dynamic sample for assay by the sensor elements. The accumulated pool of particulate material also serves as a pillow to absorb the impact from the particulate stream above the sensing chamber. This impact absorption helps reduce wear on the top of the housing and the sensor surface as well.

The sensor mount assembly continuously and reproducibly extracts a representative sample from the free flowing particulate stream and gently presents it to the sensor elements at constant velocity and packing density.

A second embodiment of the invention is shown in FIGS. 5 and 6. Three additional features are shown in this embodiment. One is an embodiment of the flow metering apparatus comprised as a screw conveyor assembly. Another is the installation of a mounting box in a process duct that is otherwise smaller than desirable for installation of a sensor mount according to the invention. Another is the installation of a scalper bar assembly over the inlet to the cell housing in order to deflect foreign matter from the process stream.

It is important that the sensor housing be installed in a manner that will permit it to intercept the particulate stream and withdraw a representative sample while allowing other material to freely bypass. In certain instances a chute or downspout will not furnish sufficient space for installation of the sensor housing and still allow relatively unencumbered bypass of excess material. FIGS. 5 and 6 show an undersized duct 52 carrying a free flowing stream of particulate material 37. The transverse dimension of the duct 52 is insufficient to permit normal installation of a sensor assembly according to the invention. Accordingly, a mounting box 53 of sufficient size to mount a sensor housing is installed intermediately in the duct 52. Mounting box 53 has a top wall 54 with an opening 55 coextensive with the perimeter of the upper section of the duct 52. Box 53 has a bottom wall 56 with an opening 57 also coextensive with the perimeter of the opening of an adjacent lower section of the duct 52. Box 53 has a front wall 59 with a front opening 60.

A sensor mount assembly 61 according to a second form of the invention is installed in the mounting opening 60. The sensor mount assembly 61 includes a sampling housing 62 having a front wall 63 and a back wall 64. Front wall 63 has dimensions larger than corresponding dimensions of the opening 60 for purposes of mounting the housing 62 in the mounting box 53. The housing 62 has side walls 66, 67 that carry sensor elements 73, 74. The housing 62 has an inlet opening 68. A sensing chamber 70 is located within the housing 62 defined by the various side walls. A bottom wall 69 comprised as a curved trough closes the housing 62. An outlet opening 71 is open to the side of the housing at the lower end of the back wall 64. Though 69 empties to outlet opening 71.

A flow metering apparatus 76 is installed at the lower end of housing 62 in blocking relationship between the sensing chamber 70 and the outlet opening 71. Flow metering apparatus 76 includes a metering element comprised as a screw conveyor having a screw flight 78 mounted on a rotating shaft 79 and seated in trough 69. Shaft 79 is horizontal and is aligned with the outlet opening 71. One end of shaft 79 extends through the front wall 63 of housing 62 and is connected to a variable speed motor 81 located in a utility cabinet 82 mounted to the outside of front wall 63.

Upon operation of the screw conveyor, screw flight 78 transports particulate material from within the sensing chamber 70 through the outlet opening 71 at a controlled rate. This enables the maintenance of a uniform flow rate of particulate matter through the sensing chamber past the sensor elements 73, 74.

A scalper bar assembly is installed over the inlet 68 in order to deflect foreign material away from the housing 62. The scalper bar assembly includes a plurality of parallel, spaced apart, angularly mounted scalper bars 83 fixed to a wall 59 of the mounting box 73 and positioned over the inlet opening 68.

The interior dimensions of the mounting box 53 are greater than those of the duct 52 whereby the sensor mount assembly 61 is conveniently installed therein. The mounting box 53 provides a sufficient passageway for particulate stream 37 past the sensor housing while permitting an ample portion of the particulate stream to be intercepted by the sensor housing. An access door 85 mounted on the mounting box 52 opposite the front wall 59 permits access to the sensor mount assembly 61.

A further form of sensor mount assembly is shown in FIGS. 7 and 8. A process stream duct 21 carries a process stream 37. A sensor mount assembly 88 is installed in an opening 22 of the duct 21. The sensor mount assembly 88 includes a housing 89 having a front wall 90, a back wall 91, and side walls 92, 93. Sensor elements 94, 95 are installed on the side walls 92, 93 across from one another. An inlet opening 96 opens to a sensing chamber 98. An outlet opening 97 on a side of the housing 89 is located at the lower end of the back wall 91.

A flow metering apparatus 99 is positioned in blocking relationship between the sensing chamber 98 of housing 89 and the outlet opening 97. The flow metering apparatus 99 is comprised as a conveyor belt assembly including and endless conveyor belt 101. Conveyor belt 101 is trained over a drive roller 102 at one end, and an idler roller 103 at the other. The upper run of conveyor belt 101 moves between the front wall 90 toward the back wall 91 at the bottom of the sensing chamber 98. The front end of the conveyor belt is positioned adjacent the outlet opening 97 such that particulate matter 37 is transported from a position from within the sensing chamber 98 through the discharge opening 97.

The idler roller 103 is mounted on suitable axle mounting structure 106. The drive roller 102 is connected to a variable speed motor 105 that is contained in a utility cabinet 106. Through motor 105, the conveyor belt 101 is operated at a constant speed to continuously remove particulate material from the sensing chamber 98 resulting in a consistent flow of particulate material past the sensor elements 94, 95.

A yet further form of the invention is shown in FIGS. 9 and 10 which show the process stream duct 21 carrying a process stream 37. A sensor mount assembly according to a further form of the invention is indicated generally at 109 and is installed in an opening 22 of the duct 21. The sensor mount assembly 109 includes a sampling housing 110 having a front, mounting wall 111, a back wall 113, and lateral side walls 114, 115 defining a sensing chamber 118. Sensor elements 116, 117 are mounted across from one another on side walls 114, 115. An inlet opening 119 is open at the top of housing 110 to sensing chamber 118. An outlet opening 120 is located at the lower end of the back wall 113.

A flow metering apparatus 121 is positioned in blocking relationship between the sensing chamber 118 of housing 110 and the outlet opening 120. The flow metering apparatus is comprised as an air stream generator assembly 123. The air stream generator 123 includes a variable speed motor comprised as a solenoid valve assembly 124 located in the utility cabinet 125 and connected to a compressed air supply line 126. A metering element includes an air nozzle and a stream or jet of air ejected through the nozzle orifice. An air nozzle 127 extends from air motor 124 into the lower end of sensing chamber 118 and is pointed at the outlet opening. An upwardly open curved trough 128 is located at the bottom of the housing 110. Particulate material 37 passing through housing 110 tends toward landing on trough 128. Air motor 124 delivers either a continuous stream of air or a high frequency pulse of air that is effectively a continuous stream, through nozzle 127. The air very gently transports particulate material over trough 128 and through outlet opening 120 at a rate controlled by the volumetric air flow provided by air motor 124.

Several examples of flow metering apparatus have been shown and described. Those skilled in the art will recognize that other embodiments of a flow metering apparatus could be used as well. The equivalent apparatus will be located in blocking relationship between the sensing chamber of the housing and the outlet opening, and will have a metering element operated by a motor, that transports particulate material at a controlled rate from the sensing chamber to the outlet opening.

What is claimed is:

1. An on-line sensor mount assembly for installation in a mounting opening in a wall of a duct that is part of a process stream duct system carrying a free flowing particulate material in a duct channel, for use in measurement of a physical property of the material, comprising:

a sampling housing having a side wall arrangement including vertical side walls defining a vertical passage with an upwardly open inlet end;

said vertical passage having a substantially uniform cross section shape throughout the length thereof and defining a sensing chamber, said side wall arrangement including a flat front wall with peripheral dimensions larger than corresponding dimensions of the mounting opening in a duct wall for intended insulation of the housing with the edges of the front wall housing fastened to peripheral exterior edges of a duct wall mounting opening and the housing located in a duct channel to intercept through the inlet opening a sample of particulate material from a process stream;

an outlet opening at the lower end of the housing;

a flow metering apparatus having a movable flow metering element and a motor to drive the flow metering element;

said flow metering element installed in blocking relationship between the sensing chamber of the housing and the outlet opening and positioned so that operation of the motor to continuously move the flow metering element is effective to continuously transport a particulate material from the sensing chamber through the outlet opening;

said motor installed outside of the duct when the housing is installed in a duct channel and connected to the flow metering element through the duct wall.

2. The on-line sensor mount assembly of claim 1 including:
at least one sensor element installed on a wall of the housing.

3. The on-line sensor mount assembly of claim 1 including:
a utility cabinet connected to the front wall of the housing opposite the sensing chamber.

4. The on-line sensor mount assembly of claim 3 wherein:
said motor is located in the utility cabinet.

5. The on-line sensor mount assembly of claim 1 wherein:
the flow metering apparatus includes a brush assembly.

6. The on-line sensor mount assembly of claim 1 wherein:
the flow metering apparatus includes a brush assembly having as a flow metering element a round bristle brush mounted on a shaft, and the motor is comprised as a variable speed motor connected to the shaft.

7. The on-line sensor mount assembly of claim 6 including:
a utility cabinet connected to the front wall of the housing opposite the sensing chamber;
said motor located in the utility cabinet.

8. The on-line sensor mount assembly of claim 1 wherein:
the flow metering apparatus includes a conveyor belt assembly.

9. The on-line sensor mount assembly of claim 8 wherein:
said housing includes a back wall opposite the front wall, and lateral side walls between the front and back walls, said outlet opening located at the lower end of the back wall;
said conveyor belt assembly including an endless conveyor belt;
a drive pulley mounted on the motor and an idler pulley mounted near the outlet opening;
said conveyor belt trained over the drive pulley and the idler pulley, having a width substantially spanning the width of the housing between the lateral side walls, and having a forward run from the front wall to the back wall, positioned beneath the sensing chamber to transport particulate material from the sensing chamber through the outlet opening.

10. The on-line sensor mount assembly of claim 9 including:
a utility cabinet connected to the front wall of the housing opposite the sensing chamber;
said motor located in the utility cabinet.

11. The on-line sensor mount assembly of claim 10 including:
at least one sensor element mounted on a wall of the housing.

12. The on-line sensor mount assembly of claim 1 wherein:
said flow metering apparatus includes a screw conveyor assembly.

13. The on-line sensor mount assembly of claim 12 wherein:
said screw conveyor assembly includes a screw flight mounted on a shaft;
a curved trough at the lower end of the sensing chamber and extending to the outlet opening;
said screw flight located in the trough to transport particulate material from the sensing chamber through the outlet opening;
said motor comprised as a variable speed motor connected to the shaft.

14. The on-line sensor mount assembly of claim 13 including:
a utility cabinet connected to the front wall of the housing opposite the sensing chamber;
said motor located in the utility cabinet.

15. The on-line sensor mount assembly of claim 14 including:
at least one sensor element mounted on one of the housing walls.

16. The on-line sensor mount assembly of claim 1 wherein:
said flow metering apparatus includes an air stream generator assembly.

17. The on-line sensor mount assembly of claim 16 wherein:
said housing includes a back wall opposite the front wall, said outlet opening located at the lower end of the back wall;
said motor including an air stream generating device, and a nozzle extending from the device into the housing and pointed at the outlet opening to direct an air stream to blow particulate material from the sensing chamber through the outlet opening.

18. The on-line sensor mount assembly of claim 17 including:
a curved trough located at the bottom of the sensing chamber oriented toward the outlet opening and located so that particulate material passing through the sensing chamber tends to land upon it.

19. The on-line sensor mount assembly of claim 18 including:
a utility cabinet connected to the front wall of the housing opposite the sensing chamber;
said motor located in the utility cabinet.

20. The on-line sensor mount assembly of claim 19 including:
at least one sensor element mounted on a wall of the housing.

21. An on-line sensor mount assembly for installation in a process stream of free flowing particulate material, for use in measurement of a physical property of the material, comprising:
a sampling housing having a side wall arrangement including vertical side walls defining a vertical passage with an upwardly open inlet opening at the upper end of the housing, and a downwardly open outlet opening at the lower end of the housing;
said vertical passage having a substantially uniform cross section shape throughout the length thereof and defining a sensing chamber;
a flow metering apparatus including a brush having a brush shaft and spaced apart brush elements radially extended from the shaft, and a motor to rotate the shaft;
said brush installed in blocking relationship between the sensing chamber of the housing and the outlet opening and positioned so that operation of the motor to rotate the brush is effective to continuously transport a particulate material from the sensing chamber through the outlet opening;
said motor installed outside of the housing and connected to the brush shaft through a side wall of the housing.

22. The on-line sensor mount assembly of claim 21 including:
at least one sensor element installed on a wall of the housing.

23. The on-line sensor mount assembly of claim 22 wherein:
said brush is a bristle brush.

24. The on-line sensor mount assembly of claim 23 wherein:
one of said side walls has a foreshortened lower edge creating a side opening in the housing connected to the outlet opening, said brush occupying said side opening in a fashion such that upon rotation of the brush, the downward stroke of the brush elements takes place within the housing.

25. The on-line sensor mount assembly of claim 24 wherein:
said motor is a variable speed motor.

26. An on-line sensor mount assembly for installation in a process stream of free flowing particulate material, for use in measurement of a physical property of the material, comprising:
a sampling housing having a side wall arrangement including vertical side walls defining a vertical passage with an upwardly open inlet opening at the upper end of the housing, and an outlet opening at the lower end of the housing open to a side of the housing;
said vertical passage having a substantially uniform cross section shape throughout the length thereof and defining a sensing chamber;
a flow metering apparatus installed at the lower end of the housing comprised as a conveyor belt assembly having a conveyor belt, a drive pulley, an idler pulley, said conveyor belt installed on the idler pulley and the drive pulley at the bottom of the sensing chamber in the housing with The top run of the conveyor belt positioned to catch a particulate material falling through the sensing chamber and transport it through the outlet opening; and
a motor connected to the drive pulley to move the conveyor belt.

27. The on-line sensor mount assembly of claim 26 wherein:
said motor is a variable speed motor and is mounted exterior to the housing.

28. An on-line sensor mount assembly for installation in a process stream of free flowing particulate material, for use in measurement of a physical property of the material, comprising:
a sampling housing having a side wall arrangement including vertical side walls defining a vertical passage with an upwardly open inlet opening at the upper end of the housing, and an outlet opening at the lower end of the housing open to a side of the housing;
said vertical passage having a substantially uniform cross section shape throughout the length thereof and defining a sensing chamber;
a flow metering apparatus installed at the lower end of the housing including an air stream generator, a nozzle connected to the air stream generator and extended into the lower end of the housing and pointed at the outlet opening in order to blow a particulate material through the outlet opening.

29. The on-line sensor mount assembly of claim 28 including:
a trough located at the bottom of the housing positioned where particulate material will tend to land upon it, said nozzle directed to blow air over the trough.

* * * * *